(12) United States Patent
Ogino

(10) Patent No.: US 6,869,577 B2
(45) Date of Patent: Mar. 22, 2005

(54) SYSTEMS AND METHODS FOR PURIFYING EXHAUST GAS EMISSION FROM FUEL REFORMING DEVICE

(75) Inventor: Shigeru Ogino, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 5 days.

(21) Appl. No.: 09/946,591

(22) Filed: Sep. 6, 2001

(65) Prior Publication Data

US 2002/0031453 A1 Mar. 14, 2002

(30) Foreign Application Priority Data

Sep. 11, 2000 (JP) ........................................ 2000-274333

(51) Int. Cl.[7] .............................. B01J 8/00; G05D 23/00
(52) U.S. Cl. ....................... 422/189; 422/108; 422/111; 422/182; 422/177
(58) Field of Search ................................ 422/168, 171, 422/173, 177, 169, 194, 187–190, 198, 211, 105, 107, 108–111, 115, 182; 429/19–20, 22, 24

(56) References Cited

U.S. PATENT DOCUMENTS

| | | | | |
|---|---|---|---|---|
| 3,928,961 A | * | 12/1975 | Pfefferle | 60/777 |
| 4,038,032 A | * | 7/1977 | Brewer et al. | 436/55 |
| 4,046,956 A | * | 9/1977 | Fanciullo | 429/20 |
| 5,141,823 A | * | 8/1992 | Wright et al. | 429/19 |
| 5,248,567 A | * | 9/1993 | Amemiya et al. | 429/20 |
| 5,330,857 A | * | 7/1994 | Sederquist et al. | 429/13 |
| 5,340,020 A | * | 8/1994 | Maus et al. | 237/12.3 C |

FOREIGN PATENT DOCUMENTS

| | | |
|---|---|---|
| JP | A 10-040942 | 2/1998 |
| JP | A 11-233129 | 8/1999 |

* cited by examiner

*Primary Examiner*—Hien Tran
*Assistant Examiner*—Jennifer A. Leung
(74) *Attorney, Agent, or Firm*—Oliff & Berridge, PLC

(57) ABSTRACT

A purifying system includes a purifying device for purifying a combustion-exhaust gas emitted from a fuel reforming device, a flow control valve for introducing anode-off gas discharged from a fuel cell into the purifying device through an anode-off-gas supply pipe, and a control device for controlling the opening angle of the flow control valve on the basis of the temperature of the purifying device detected by a temperature sensor, so that an oxidizing reaction of hydrogen through a catalyst incorporated in the purifying device is promoted by the introduced anode-off gas containing pre-reaction hydrogen and pre-reformed fuel. The temperature of the catalyst in the purifying device is raised by heat of the oxidizing reaction of hydrogen, to a level at which the catalyst is sufficiently activated, so that the combustion-exhaust gas is purified by the purifying device.

4 Claims, 4 Drawing Sheets

SYSTEMS AND METHODS FOR PURIFYING EXHAUST GAS EMISSION FROM FUEL REFORMING DEVICE

INCORPORATION BY REFERENCE

The disclosure of Japanese Patent Application No. 2000-274333 filed on Sep. 11, 2000 including the specification, drawings and abstract, is incorporated herein by reference in its entirety.

BACKGROUND OF THE INVENTION

1. Field of the Invention

The invention relates to techniques for purifying combustion-exhaust gas emitted from a fuel reforming device, which supplies a fuel cell with reformed fuel.

2. Description of Related Art

One known method that reforms an original or pre-reformed fuel and generates reformed fuel (hydrogen-rich gas) uses steam produced within a fuel reforming device. To produce the steam in this water-vapor reforming method, the fuel reforming device includes a heater for burning exhaust gas emitted from a fuel cell, so-called "anode-off and cathode-off gases", or for burning a portion of the pre-reformed fuel to be reformed by the fuel reforming device. Exhaust gas emitted from the fuel reforming device as a result of combustion of the anode-off and cathode-off gases or the pre-reformed fuel, more precisely, an exhaust gas emitted from the heater of the fuel reforming device is discharged into the atmosphere, without any treatment to purify the exhaust gas.

However, the above-described fuel reforming device suffers from a problem that the exhaust gas emitted from the fuel reforming device contains an unburned fuel component and carbon monoxide, though the contents of the unburned fuel component and carbon monoxide are smaller than those contained in an exhaust gas emitted from an internal combustion engine. In view of an expected increase of demand for fuel cells and a consequent increase of the total volume of the exhaust gases emitted from the fuel reforming devices for the fuel cells, there is a need for a suitable treatment for purifying the exhaust gas emitted from the fuel reforming device, from the standpoint of air pollution control (atmospheric contamination control) and ecology.

SUMMARY OF THE INVENTION

It is therefore an object of this invention to purify a combustion-exhaust gas emitted from a fuel reforming device.

According to a first aspect of this invention, there is provided a purifying system that purifies a combustion-exhaust gas emitted from a fuel reforming device operable to supply a fuel cell with a reformed fuel. The purifying system comprises an exhaust gas passage through which the combustion-exhaust gas emitted from the fuel reforming device is discharged; and a purifying device arranged in the exhaust gas passage and operable to purify the combustion-exhaust gas.

The purifying system according to the first aspect of this invention is operable to purify the combustion-exhaust gas emitted from the fuel reforming device, making it possible to prevent air pollution or atmospheric contamination, and to deal with the combustion-exhaust gas relatively simply.

According to a second and third aspects of the invention, there are provided methods of purifying a combustion-exhaust gas emitted from a fuel reforming device operable to supply a fuel cell with a reformed fuel. The method according to the second aspect comprises introducing the combustion-exhaust gas emitted from the fuel reforming device into a purifying device including a burner; and burning the combustion-exhaust gas by the burner. The method according to the third aspect comprises introducing the combustion-exhaust gas emitted from the fuel reforming device into a purifying device including an oxidation catalyst; and purifying the combustion-exhaust gas by the oxidation catalyst.

In the purifying methods according to the second and third aspect of this invention, the combustion-exhaust gas emitted from the fuel reforming device is purified, making it possible to prevent air pollution or atmospheric contamination, with a relatively simple arrangement.

BRIEF DESCRIPTION OF THE DRAWINGS

The above and other objects, features, advantages, and technical and industrial significance of this invention will be better understood by reading the following detailed description of presently preferred exemplary embodiments of the invention, when considered in connection with the accompanying drawings, in which.

DETAILED DESCRIPTION OF PREFERRED EMBODIMENTS

Figure 1:
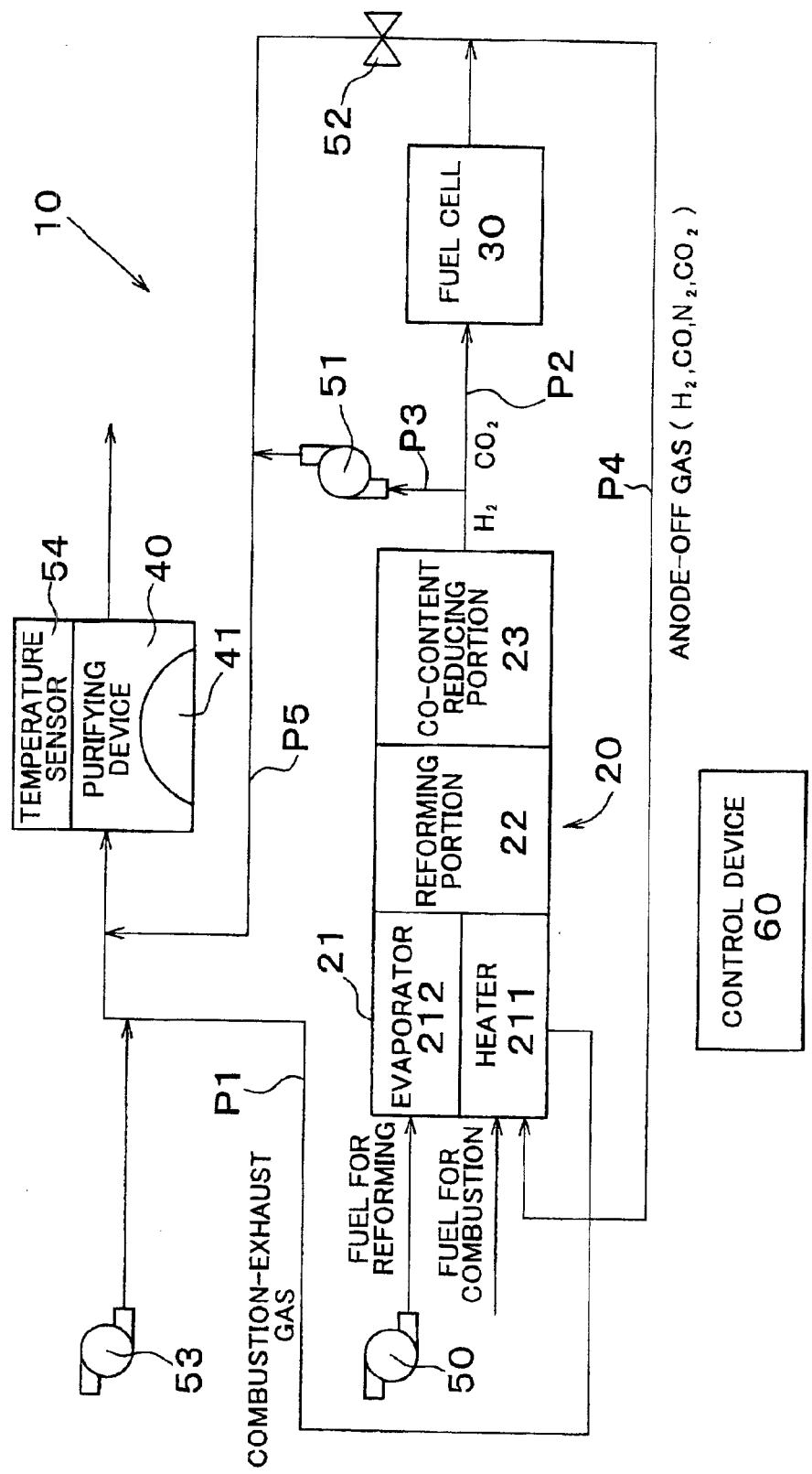
FIG. 1 is a block diagram schematically showing an arrangement of a purifying system according to an embodiment of this invention, for purifying an exhaust gas (a combustion-exhaust gas) emitted from a fuel reforming device.

Referring to FIG. 1, there will be described a purifying system according to an exemplary embodiment of this invention for purifying an exhaust gas (a combustion-exhaust gas) emitted from a fuel reforming device.

The purifying system 10 includes a purifying device 40 arranged to purify the exhaust gas (the combustion-exhaust gas) emitted from a fuel reforming device 20, which supplies a reformed fuel to a fuel cell 30. The purifying system 10 further includes a control device 60 for controlling the purifying device 40 and other components of the system, which will be described below.

The fuel reforming device 20 is constructed to reform an original or pre-reformed fuel-cell fuel (an original or pre-reformed fuel for a fuel cell) by a reforming reaction, primarily by a steam reforming reaction (steam reforming). The fuel reforming device 20 includes an evaporating portion 21 operable to produce steam used for the steam reforming reaction, a reforming portion 22 in which the steam reforming reaction and a partial oxidizing reaction take place, and a CO-content reducing portion 23 operable to selectively oxidize carbon monoxide produced by the reforming reaction.

The evaporating portion 21 includes a heater 211 arranged to generate heat or thermal energy necessary to produce the steam by an oxidizing reaction using a catalyst, and an evaporator 212 arranged to produce a mixed steam consisting of $H_2O$ and the pre-reformed fuel-cell fuel, by utilizing the thermal energy generated by the heater 211. The heater 211 is supplied with a portion of the pre-reformed fuel-cell fuel and/or an anode-off gas, as combustion fuel. The heater 211 incorporates a catalyst formed of Pt, Pd or any other suitable noble metal, for promoting the oxidizing reaction of the combustion fuel with oxygen. In the heater 211, heat of reaction is generated by the oxidizing reaction of the combustion fuel promoted by the catalyst, so that the generated heat of reaction is utilized for heating the evaporator 212. A portion of the combustion fuel which has not contributed to the oxidizing reaction in the heater 211 is fed as exhaust gas (the combustion-exhaust gas) to the purifying device 40 through an exhaust gas pipe or passage P1. The exhaust gas generally has a temperature of from about 100–200° C.

The evaporator 212 is supplied with the pre-reformed or original fuel-cell fuel through a fuel supply pump 50, and $H_2O$ through a water pump (not shown). In the evaporator 212, the supplied pre-reformed fuel-cell fuel and $H_2O$ are converted into the mixed steam, by the heat provided by the heater 211. The mixed steam is supplied to the reforming portion 22. The pre-reformed fuel-cell fuel includes hydrocarbon, alcohol, ether, aldehyde, and other substances that include hydrogen atoms.

The reforming portion 22 incorporates a catalyst formed of a base metal material such as a Cu—Zn alloy, for promoting the reforming reaction. In the reforming portion 22, the mixed steam including the pre-reformed fuel and $H_2O$ supplied from the evaporator 212 is converted by the steam reforming reaction and the partial oxidizing reaction into reformed gas, which includes hydrogen and carbon dioxide. The reformed gas, which includes carbon monoxide as well, is fed into the CO-content reducing portion 23, which reduces the content of the carbon monoxide contained in the reformed gas.

The CO-content reducing portion 23 incorporates a catalyst formed of Pt, Ru or any other suitable noble metal, or a catalyst formed of Al, for promoting a selective oxidizing reaction by which the carbon monoxide contained in the reformed gas is converted into carbon dioxide. The reformed gas is supplied from the CO-content reducing portion 23 to the fuel cell 30 through a reformed gas pipe or passage P2.

A branch pipe or passage P3 is connected at one of its opposite ends to the reformed gas pipe P2, and is provided with a reformed gas supply pump 51.

The fuel cell 30 can be, for example, a polymer electrolyte fuel cell, and incorporates a stack of a plurality of cells superposed on each other. The fuel cell 30 is adapted to receive as a fuel the reformed gas supplied from the fuel reforming device 20, and to generate electric energy by a chemical reaction of the fuel. Generally, the reformed gas supplied from the fuel reforming device 20 is introduced to the anode of the fuel cell 30, while air supplied from an air pump (not shown) is introduced to the cathode. A part of the reformed gas which has not been used for the chemical reaction within the fuel cell 30 is returned, as "anode-off gas", to the heater 211 of the fuel reforming device through a return pipe or passage P4. In this embodiment, the anode-off gas is used as part of the combustion fuel to be used by the heater 211.

In the purifying system 10 of this embodiment, the anode-off gas is also fed through an anode-off-gas supply pipe or passage P5 to the purifying device 40. The anode-off-gas supply pipe P5 is provided with a flow control valve 52 operable to regulate the rate of flow of the anode-off gas from the fuel cell 30 to the purifying device 40. The branch pipe P3 indicated above is connected at the other end to the anode-off-gas supply pipe P5.

To the exhaust gas pipe P1, there is connected an air pump 53 for introducing air into the exhaust gas in the pipe P1, as needed, to adjust the content of the air in the exhaust gas in the pipe P1.

The purifying device 40 incorporates a purifying catalyst 41, that is an exhaust emission purifying catalyst formed of $Pt—Al_2O_3$ or palladium, for instance, which is commonly used for internal combustion engines. The unburned fuel component (HC) and carbon monoxide contained in the exhaust gas discharged from the heater 211 of the evaporating portion 21 through the exhaust gas pipe P1 and introduced into the purifying device 40 are purified into $H_2O$ and carbon dioxide, by the oxidizing reaction promoted by the purifying catalyst 41. The exhaust gas thus purified by the purifying device 40 is discharged into the atmosphere. The purifying device 40 is provided with a temperature sensor 54 for detecting the temperature within the device 40. The purifying catalyst 41 incorporated within the purifying device 40 is usually placed in a sufficiently activated state at a temperature of about 300–500° C. Accordingly, the temperature within the purifying device 40 (the temperature of the catalyst 41) is required to be controlled as described below, so as to be kept within a predetermined or selected suitable range, in order to prevent unpurified exhaust gas from being discharged into the atmosphere.

Figure 2:
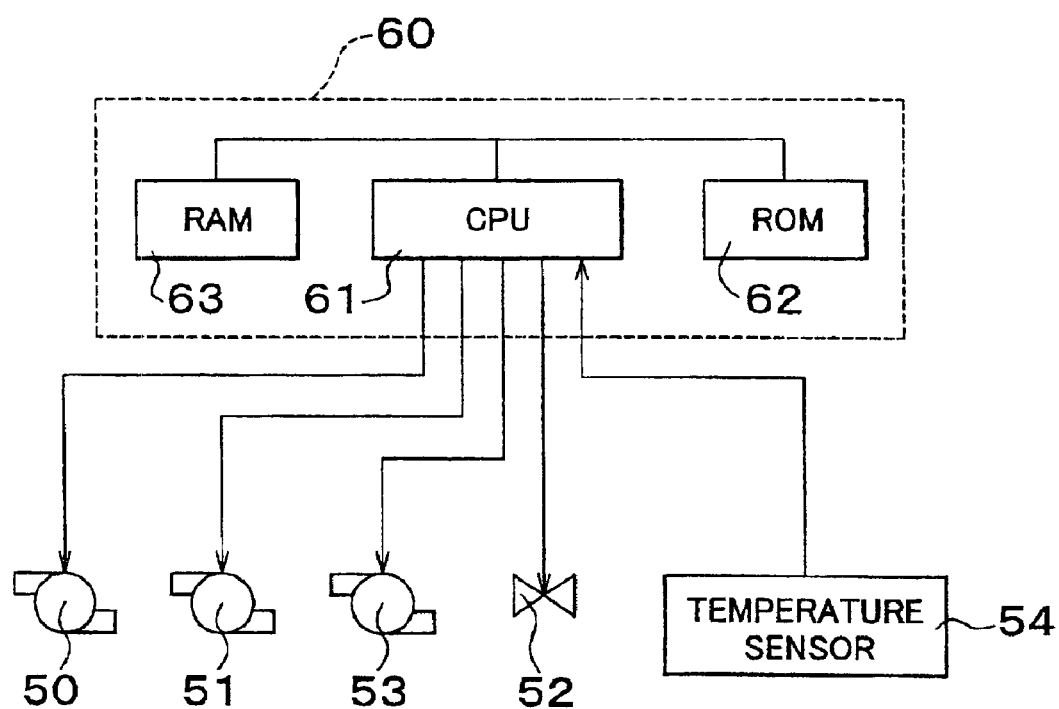
FIG. 2 is a block diagram schematically showing an arrangement of a control device for controlling the purifying system of FIG. 1.

The control device 60 is arranged to control the purifying device 40 and other components of the purifying system 10 for the fuel reforming device 20, according to this invention. The arrangement of the control device 60 will be described in detail by reference to the schematic block diagram of FIG. 2.

The control device 60 includes a central processing unit (CPU) 61, a read-only memory (ROM) 62, and a random-access memory (RAM) 63. The CPU 61 is operable to perform various arithmetic operations. The ROM 62 stores: a control program for executing a temperature control routine for controlling the temperature within the purifying device 40 within the predetermined or selected suitable range; a data map representing a predetermined or selected relationship between the temperature of the purifying device 40 and the angle of opening of the flow control valve 52; and other data. An exemplary temperature control routine is illustrated in the flow chart shown in FIG. 3, and an example of the predetermined or selected relationship represented by the data map is indicated in the graph of FIG. 4. The RAM 63 is provided to temporarily store various data or information obtained as a result of the arithmetic operations performed by the CPU 61.

The CPU 61 and the ROM 62 are interconnected to each other for bidirectional or unidirectional data communication. The CPU 61 and the RAM 63 are interconnected to each other for bi-directional data communication. To the CPU 61, there are connected, through an input-output interface (not shown), the fuel supply pump 50, reformed-gas supply pump 51, flow control valve 52, air pump 53 and temperature sensor 54.

Figure 3:
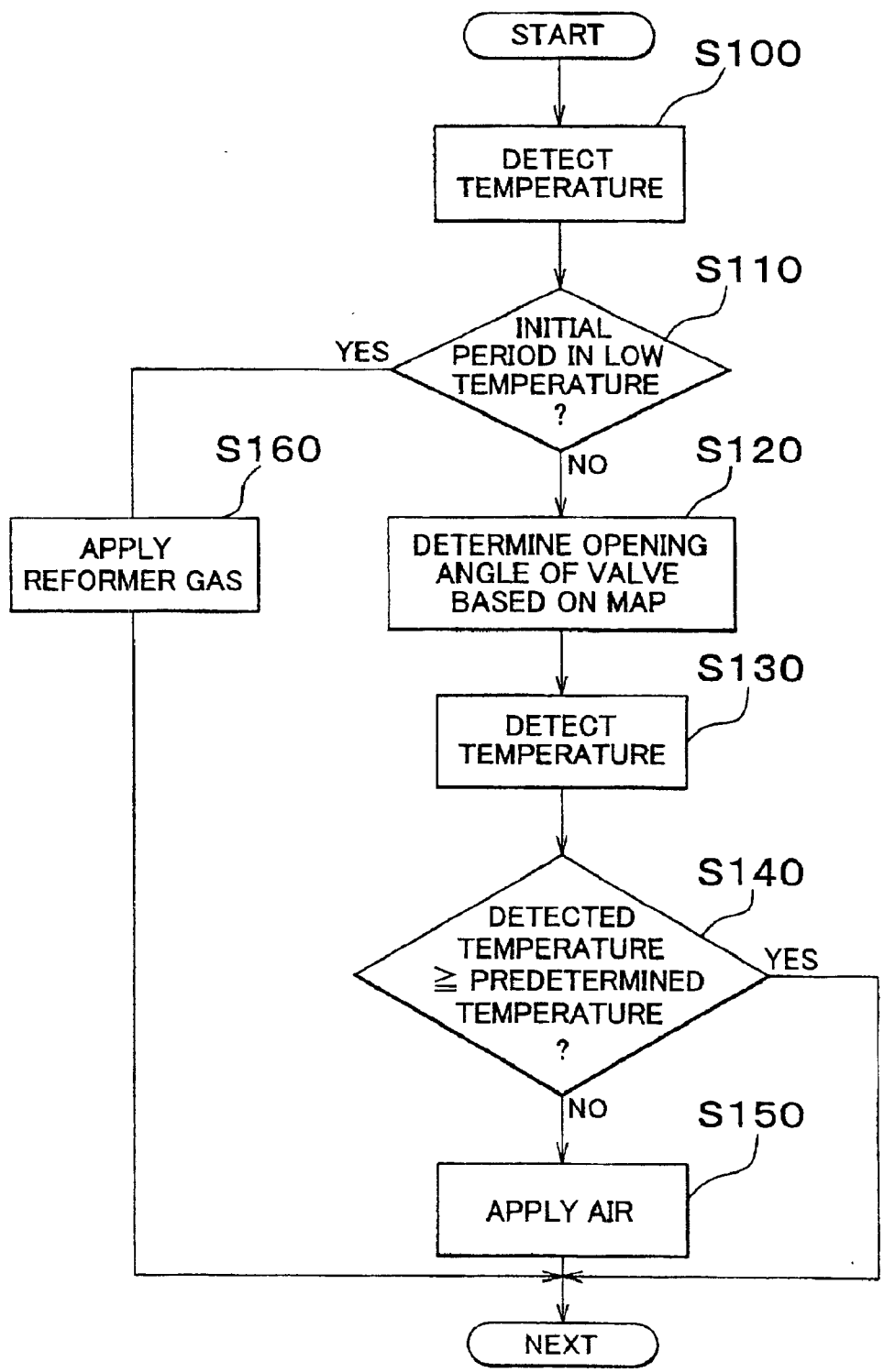
FIG. 3 is a flow chart illustrating a temperature control routine executed by the control device of FIG. 2 to control a purifying device of the purifying system of FIG. 1.
Figure 4:
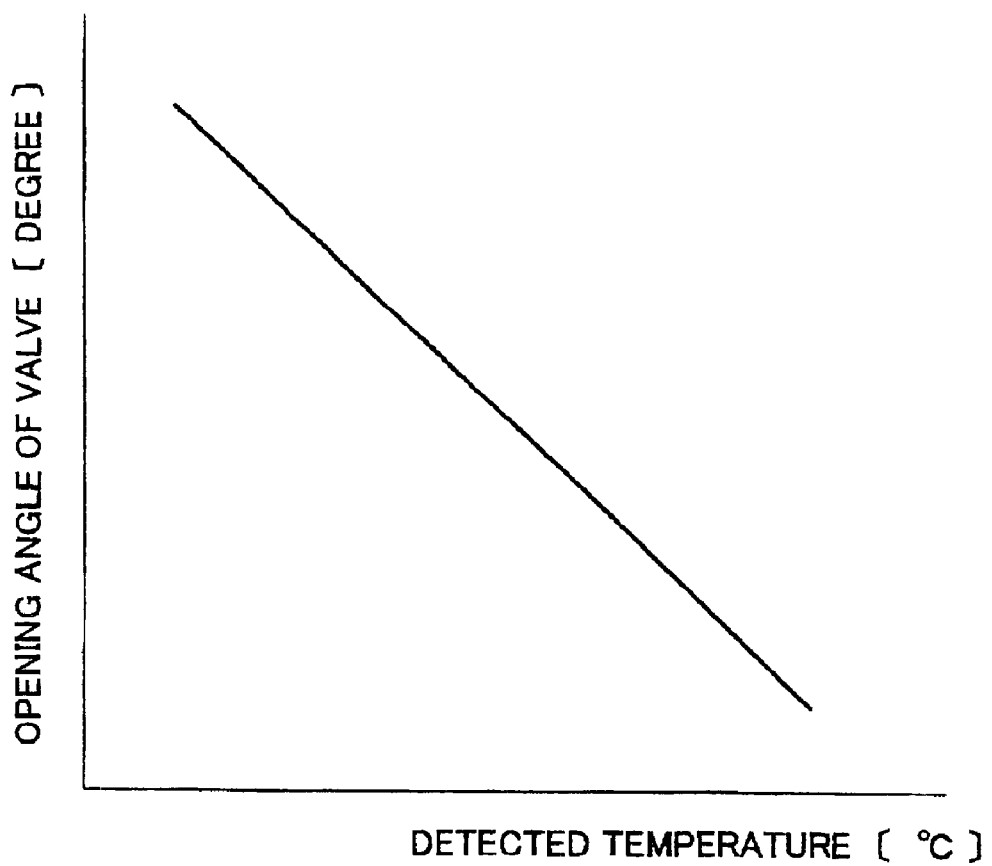
FIG. 4 is a graph indicating a stored data map used to determine the angle of opening of a flow control valve on the basis of the temperature of the purifying device.

There will next be described the operation of the control device 60 for controlling the purifying system 10, in particular, the purifying device 40, by reference to the flow chart of FIG. 3 illustrating the temperature control routine, and the graph of FIG. 4 indicating the above-indicated predetermined or selected relationship, which is used to calculate the desired angle of opening of the flow control valve 52 on the basis of the detected temperature within the purifying device 40.

The temperature control routine of FIG. 3 is initiated with step S100 in which the CPU 61 of the control device 60 calculates the temperature within the purifying device 40, on the basis of the output signal of the temperature sensor 54. Step S100 is followed by step S110 in which the CPU 61 determines whether the purifying system 10 is in an initial period of operation with the temperature of the purifying device 40 being initially lower than a predetermined or selected threshold. This determination is based on the detected temperature of the purifying device 40 and the operating state of the purifying system 10. If the CPU 61 determines that the purifying system 10 is not in the initial period of operation, that is, if a negative decision (NO) is obtained in step S110, the control flow goes to step S120 in which the CPU 61 determines the desired value of the opening angle of the flow control valve 52, according to the predetermined or selected relationship of FIG. 4 represented by the data map stored in the ROM 62, and on the basis of the detected temperature of the purifying device 40. It will be understood from the graph of FIG. 4 that the relationship is formulated so that the desired opening angle of the flow control valve 52 increases with a decrease in the detected temperature, so that the rate of flow of the anode-off gas from the fuel cell 30 into the purifying device 40 increases as the detected temperature is lowered. In step S120, the flow control valve 52 is controlled to establish the thus determined desired opening angle, so that the rate of flow of the anode-off gas from the fuel cell 30 into the purifying device 40 through the anode-off gas supply pipe P5 is controlled to a value corresponding to the established opening angle of the flow control valve 52.

As already described above, the temperature of the exhaust gas emitted from the evaporating portion 21 of the fuel reforming device 20 is generally held within a range between about 100° C. and about 200° C. The exhaust gas does not contain hydrogen. Accordingly, the temperature of the purifying catalyst 41 incorporated in the purifying device 40 cannot be raised to or above the lower limit of about 300° C., for example, of the suitable range within which the purifying catalyst 41 is sufficiently active. Further, in the absence of hydrogen in the exhaust gas, the catalyst 41 cannot be heated with heat of reaction generated by the oxidizing reaction of hydrogen. The purifying system 10 is arranged according to this embodiment, to supply the purifying device 40 with the anode-off gas, which is discharged from the fuel cell 30 and which contains non-reformed fuel, and hydrogen that has not reacted and the like, so that the hydrogen and the like contained in the anode-off gas reacts with oxygen through the catalyst 41 (catalytic combustion), to generate heat of an oxidizing reaction for heating the purifying device 40 (catalyst 41) to a temperature equal to or higher than the lower limit of the suitable range in which the catalyst 41 is in a sufficiently active state. If the temperature within the purifying device 40 has exceeded a predetermined or selected upper limit of about 1000° C., for example, of the suitable range, the opening angle of the flow control valve 52 is reduced to prevent a rise of the temperature of the purifying device 40 above 1000° C. above which nitrogen oxides are produced. Thus, the temperature within the purifying device 40 can be held within the predetermined or selected suitable range, that is, equal to or higher than the lower limit (e.g., about 300° C.) above which the catalyst 41 is sufficiently active, and lower than the upper limit (e.g., about 1000° C.) above which nitrogen oxides are undesirably produced.

The control flow then goes to step S130 in which the CPU 61 again detects (calculates) the temperature of the purifying device 40 on the basis of the output signal of the temperature sensor 54. Step S140 is then implemented to determine whether the detected temperature is equal to or higher than the predetermined or selected lower limit above which the catalyst 41 incorporated within the purifying device 40 is in a sufficiently activated state.

If the CPU 61 determines that the detected temperature is equal to or higher than the predetermined or selected lower limit, that is, if an affirmative decision (YES) is obtained in step S140, it indicates that the exhaust gas discharged from the fuel reforming device 20 into the purifying device 40 through the exhaust gas pipe P1 can be effectively purified within the purifying device 40. In this case, one cycle of execution of the temperature control routine is terminated.

If the CPU 61 determines that the detected temperature of the purifying device 40 is lower than the predetermined or selected lower limit, that is, if a negative decision (NO) is obtained in step S140, the control flow goes to step S150 in which the air pump 53 is turned on to introduce air as an oxidizing agent into the purifying device 40 through the exhaust gas pipe P1. The fact that the temperature of the purifying device 40 cannot be raised to the predetermined or selected lower limit even while the anode-off gas is supplied to the purifying device 40 indicates that the oxidizing reaction of hydrogen is not efficiently effected, that is, the amount of oxygen within the purifying device 40 is insufficient. In this event, therefore, air containing oxygen as an oxidizing agent is introduced into the purifying device 40, for the purpose of promoting the oxidizing reaction within the purifying device 40, to thereby raise the temperature within the purifying device 40. The amount of air to be introduced into the purifying device 40 may be determined according to a predetermined or selected relationship among the desired amount of introduction of the air, the temperature of the purifying device 40 and the oxygen content in the exhaust gas, and the like and on the basis of the detected temperature and the detected or known oxygen content in the exhaust gas. This relationship is represented by a data map stored in the ROM 62. Upon completion of the introduction of the air into the purifying device 40 by the air pump 53, one cycle of execution of the temperature control routine is terminated. As described above, the oxidizing reaction within the purifying device 40 can be controlled by introducing the oxidizing agent in the form of air into the purifying device 40, as needed.

While the foregoing description refers to the manner of controlling the temperature within the purifying device 40 where the purifying system 10 is not placed in the initial period of operation at a relatively low temperature within the purifying device 40, there will be described a manner of controlling the temperature where the purifying system 10 is placed in the initial period of operation.

If the CPU 61 determines that the purifying system 10 is placed in the initial period of operation while the temperature within the purifying device 40 is initially lower than the predetermined or selected threshold (i.e. the lower limit), that is, if an affirmative decision (YES) is obtained in step S110 in the present cycle of execution of the temperature control routine of FIG. 3, the control flow goes to step S160 in which the reforming-gas supply pump 51 is activated to introduce a portion of the residual reformed gas delivered from the reforming device 20, into the purifying device 40 through the branch pipe P3 and the anode-off-gas supply pipe P5. The residual reformed gas delivered from the reforming device 20 is a hydrogen-rich gas, so that the introduction of the reformed gas into the purifying device 40 will cause an oxidizing reaction of hydrogen through the purifying catalyst 41 within the purifying device 40, so that the purifying catalyst 41 within the purifying device 40 can be heated to or above the lower limit of the predetermined or selected suitable range within which the catalyst 41 is in a sufficiently activated state. The hydrogen concentration of the hydrogen-rich reformed gas is considerably higher than that of the anode-off gas, so that the temperature of the purifying catalyst 41 can be rapidly raised to or above the lower limit of the suitable range, in the presence of the hydrogen-rich reformed gas within the purifying device 40, even where the temperature within the purifying device 40 is initially low. It is also noted that even when the purifying system 10 is in an initial period of operation, the temperature of the residual reformed gas as delivered from the purifying device 20 may be as high as several hundreds of degrees centigrade, so that the purifying device 40 may be heated with the heat energy of the reformed gas. The temperature of the residual reformed gas as delivered from the purifying device 20 for molten carbonate type fuel cell or solid oxide type fuel cell is e.g., 300–900° C. It is further noted that where the fuel cell 30 is of molten carbonate type or solid oxide type, the temperature of the cathode-off gas and the anode-off gas discharged from the fuel cell 30 is as high as 600–1000° C., the purifying device 40 can also be heated by utilizing the cathode-off and anode-off gases. In addition, the temperature within the purifying device 40 can be controlled to be held within the predetermined or selected suitable range, by suitably adjusting the rate of flow of the reformed gas or cathode-off and anode-off gases from the fuel reforming device 20 or fuel cell 30 to the purifying device 40. As indicated above, the suitable range of the temperature within the purifying device 40 is between the lower limit above which the catalyst 41 is sufficiently active, and the upper limit above which nitrogen oxides are undesirably produced. For instance, the suitable temperature range is between 300° C. and 1000° C. in this embodiment.

The purifying system 10 constructed according to this embodiment of the invention for purifying the exhaust gas emitted from the fuel reforming device 20 is arranged to be capable of introducing the anode-off gas discharged from the fuel cell 30 into the purifying device 40, as described above, so that the temperature of the purifying device 40 can be maintained within the suitable range within which the purifying catalyst 41 incorporated within the purifying device 40 is sufficiently highly active.

Further the purifying system 10 is arranged to be capable of introducing a portion of the reformed gas delivered from the fuel reforming device 20 into the purifying device 40 when the purifying system 10 is placed in an initial period of operation with the temperature within the purifying device 40 being initially lower than the predetermined or selected lower limit. Accordingly, the temperature of the purifying device 40, namely, the temperature of the purifying catalyst 41 incorporated within the purifying device 40, can be rapidly raised to or above the lower limit of the suitable range in which the catalyst 41 is in a sufficiently activated state.

In the purifying system 10, therefore, the exhaust gas emitted from the fuel reforming device 20 can be purified by conversion of HC, carbon monoxide and other components contained in the exhaust gas into $H_2O$, carbon dioxide and other components, which are discharged into the atmosphere. Therefore the purifying system 10 can prevent atmospheric contamination.

The purifying device 40 provided in the purifying system 10 is provided with the purifying catalyst 41 for effecting an oxidizing reaction (catalytic combustion) to purify the exhaust gas received from the fuel reforming device 20. The utilization of the oxidizing reaction through the catalyst 41 makes it possible to maintain the operating temperature of the purifying device 40 below the upper limit of about 1000° C. above which nitrogen oxides are undesirably produced. Accordingly, the exhaust gas discharged from the purifying device 40 does not contain nitrogen oxides, even where the anode-off gas discharged from the fuel cell 30 contains nitrogen. However, the temperature of the purifying device 40 need not be held lower than about 1000° C. In this respect, a suitable catalyst may be provided to reduce (reduction reaction) the nitrogen oxides when contained in the exhaust gas discharged from the purifying device 40 while the temperature is higher than 1000° C. In this embodiment, the catalyst 41 for purifying is utilized in the purifying device 40. Therefore, the purifying system can be small and simple.

There has been described one exemplary preferred embodiment of the purifying system of the invention for purifying the exhaust gas emitted from the fuel reforming device. However, it is to be understood that this preferred embodiment is given for illustrative purpose only and for easy understanding of the principle of the invention, and that the invention is not limited to the details of this embodiment, but may cover equivalents of the illustrated embodiment and may be otherwise embodied with various changes and modifications, which may occur to those skilled in the art, without departing from the spirit and scope of the invention defined in the appended claims.

For instance, the purifying device 40 incorporating the purifying catalyst 41, in order to effect an oxidizing reaction for purifying the exhaust gas emitted from the fuel reforming device 20, may be replaced by a purifying device which uses a burner or the like, which is capable of burning the anode-off gas, for instance, to purify the exhaust gas received from the fuel reforming device 20.

In the illustrated embodiment described above, the reformed-gas supply pump 51 is activated to introduce a portion of the reformed gas from the fuel reforming device 20 into the purifying device 40. However, the fuel supply pump 50 may be activated to introduce the original or pre-reformed fuel into the fuel reforming device 20, so that the residual reformed gas in the fuel reforming device 20 is forced out of the fuel reforming device 20 into the purifying device 40.

In the illustrated embodiment, the angle of opening of the flow control valve 52 is suitably controlled according to the predetermined or selected relationship (represented by the stored data map) between the desired angle of opening of the flow control valve 52, and on the basis of the detected temperature within the purifying device 40. However, the flow control valve 52 may be opened only when the temperature within the purifying device 40 is lowered below the lower limit of the predetermined or selected suitable range, so that the temperature within the purifying device 40 may be held at or above the lower limit.

While the purifying system 10 according to the illustrated embodiment is applied to the fuel reforming device 20 having the specific arrangement as described above for illustrative purpose only, the principle of the invention is equally applicable to a fuel reforming device having a modified arrangement depending upon the kind of the original or pre-reformed fuel-cell fuel, for instance, a fuel reforming device, which further includes a converting portion operable to convert carbon monoxide and $H_2O$ into carbon dioxide and hydrogen. In essence, the purifying system according to the invention is applicable, with advantages as described above, to any type of fuel reforming device from which exhaust gas is discharged.

It is also noted that the relationship of FIG. 4 represented by the stored data map for determining the desired rate of flow of the anode-off gas from the fuel cell 30 to the purifying device 40, and the relationship represented by the data map for determining the amount of introduction of air into the purifying device 40, are given for illustrative purpose only. Further, any parameters other than those described above may be used for determining the rate of flow of the anode-off gas and the amount of introduction of air, provided the temperature within the purifying device 40 can be held within the suitable range in which the catalyst 41 is sufficiently active.

The illustrated embodiment uses the anode-off gas and the reformed gas as a reaction promoting gas for promoting the oxidizing reaction within the purifying device 40. However, other gases may be used as the reaction promoting gas. Where the purifying system is provided on a hybrid vehicle including an internal combustion engine and an electric motor as drive power sources, for instance, a portion or an entirety of the exhaust gas emitted from the internal combustion engine may be used as the reaction promoting gas. Further, the exhaust gas of the internal combustion engine may be utilized for controlling the temperature of the purifying device 40 within the suitable range. It is also noted that the purifying device 40 may be used for purifying the exhaust gas of the internal combustion engine, together with the exhaust gas of the fuel reforming device 20. In this case, the exhaust gas pipe P1 may be connected to the exhaust pipe of the internal combustion engine.

It will be understood that the flow control valve 52, anode-off gas supply pipe or passage P5, and a portion of the control device 60 assigned to implement step S120 cooperate with each other to constitute an off-gas introducing mechanism. It will also be understood that the reformed gas pump 51, branch pipe or passage P2, and a portion of the control device 60 assigned to implement step S160, cooperate with each other to constitute a reformed-fuel introducing mechanism.

What is claimed is:

1. A purifying system that purifies a combustion-exhaust gas emitted from a fuel reforming device operable to supply a fuel cell with a reformed fuel, the pufifying system comprising:

an exhaust gas passage through which the combustion-exhaust gas emitted from the fuel reforming device is discharged;

a purifying device connected to the exhaust gas passage and operable to purify the combustion-exhaust gas and including a catalyst that promotes an oxidizing reaction for purifying the combustion-exhaust gas;

a controller that controls a temperature of the purifying device to be held within a selected range;

a temperature detector that detects the temperature of the purifying device; and an oxidizing-gas introducing device that introduces an oxidizing gas directly into the purifying device;

wherein the controller controls at least one of an amount of an anode-off gas discharged from an anode of the fuel cell and an amount of a reformed fuel produced by the fuel reforming device, which are introduced into the purifying device, in an amount sufficient to heat the purifying device to a temperature equal to or greater than a lower limit of the selected range, based on the temperature detected by the temperature detector, wherein the lower limit of the selected range is equal to or greater than a lowest temperature at which the catalyst is activated.

2. The purifying system according to claim 1, wherein the controller controls a temperature of the purifying device to be held within said selected range, an upper limit of the selected range being lower than a temperature which nitrogen oxides are produced by the oxidizing reaction through the catalyst.

3. The purifying system according to claim 1, wherein the controller introduces the anode-off gas into the purifying device when the temperature as detected by the temperature detector is lower than a lower limit of the selected range.

4. The purifying system according to claim 1, wherein the controller introduces the reformed fuel into the purifying device when the temperature detected by the temperature detector is lower than a lower limit of the selected range.

* * * * *